United States Patent [19]
Randall et al.

[11] Patent Number: 5,922,832
[45] Date of Patent: Jul. 13, 1999

[54] IMPACT MODIFIED MELT-STABLE LACTIDE POLYMER COMPOSITIONS AND PROCESSES FOR MANUFACTURE THEREOF

[75] Inventors: Jed Richard Randall, Minneapolis; Christopher Michael Ryan, Dayton; James Lunt, Minneapolis; Mark Henry Hartman, Minnetonka; Eric Stanley Hall, Crystal; Jeffrey John Kolstad, Wayzata; David Roy Witzke, Minneapolis, all of Minn.

[73] Assignee: Cargill, Incorporated, Minnetonka, Minn.

[21] Appl. No.: 08/958,228

[22] Filed: Oct. 27, 1997

Related U.S. Application Data

[63] Continuation of application No. 08/374,893, Jan. 19, 1995, Pat. No. 5,714,573.

[51] Int. Cl.$^6$ .................................................. C08G 63/08
[52] U.S. Cl. ...................... 528/354; 528/361; 528/366; 528/480; 528/359; 528/413; 528/415; 425/542; 264/239; 264/297.1; 264/297.2; 264/328.6
[58] Field of Search .................................. 528/354, 361, 528/366, 480, 359, 413, 415; 425/542; 264/239, 297.1, 297.2, 328.6

[56] References Cited

U.S. PATENT DOCUMENTS

| | | |
|---|---|---|
| 3,755,558 | 8/1973 | Scribner . |
| 4,045,418 | 8/1977 | Sinclair . |
| 4,057,537 | 11/1977 | Sinclair . |
| 4,526,938 | 7/1985 | Churchill et al. . |
| 4,603,171 | 7/1986 | Hsieh et al. . |
| 4,661,530 | 4/1987 | Goglewski et al. . |
| 4,719,246 | 1/1988 | Murdoch et al. . |
| 5,080,665 | 1/1992 | Jarrett et al. . |
| 5,142,023 | 8/1992 | Gruber et al. ............................ 528/354 |
| 5,180,765 | 1/1993 | Sinclair . |
| 5,216,050 | 6/1993 | Sinclair . |
| 5,247,059 | 9/1993 | Gruber et al. ............................ 528/354 |
| 5,247,073 | 9/1993 | Gruber et al. ............................ 528/354 |
| 5,252,642 | 10/1993 | Sinclair et al. . |
| 5,258,488 | 11/1993 | Gruber et al. ............................ 528/354 |
| 5,338,822 | 8/1994 | Gruber et al. ............................ 528/354 |
| 5,342,395 | 8/1994 | Jarrett et al. . |
| 5,357,035 | 10/1994 | Gruber et al. ............................ 528/354 |
| 5,359,026 | 10/1994 | Gruber et al. . |
| 5,424,346 | 6/1995 | Sinclair . |
| 5,444,113 | 8/1995 | Sinclair et al. . |
| 5,475,080 | 12/1995 | Gruber et al. ............................ 528/354 |
| 5,484,881 | 1/1996 | Gruber et al. ............................ 528/354 |
| 5,502,158 | 3/1996 | Sinclair et al. ............................ 528/354 |
| 5,714,573 | 2/1998 | Randall et al. ............................ 528/354 |

FOREIGN PATENT DOCUMENTS

| | | |
|---|---|---|
| 84/00303 | 2/1984 | WIPO . |
| 90/01521 | 2/1990 | WIPO . |
| 92/04413 | 3/1992 | WIPO . |
| WO 92/04410 | 3/1992 | WIPO . |
| WO 94/06856 | 3/1994 | WIPO . |
| WO 94/07941 | 4/1994 | WIPO . |
| WO 94/08078 | 4/1994 | WIPO . |
| 94/11441 | 5/1994 | WIPO . |

OTHER PUBLICATIONS

Chemical Abstracts, vol. 115, No. 16, Oct. 21, 1991, Abstract No. 166514, Dollinger, H.M. et al., "Biocontinuous controlled release matrix composed of poly(DL–lactic acid) blended ethylene–vinyl acetate copolymer".

Grijpma et al.; "High Impact Strength as–Polymerized PLLA", *Polymer Bull.*, vol. 29, pp. 571–578 (no month available on document, 1992).

Grijpma et al., "Star–Shaped Polylactide–Containing Block Copolymers", *Makromol. Chem., Rapid Commun.*, vol. 14, pp. 155–161 (no month available on document, 1993).

Grijpma et al., "(Co)polymers of L–lactide, 2 Mechanical Properties", *Macromol. Chem. Phys.*, vol., 195, pp. 1649–1663 (no month available on document, 1994).

Grijpma et al., "Rubber Toughening of Poly(Lactide) by Blending and Block Copolymerization", *Polymer Science and Eng.*, vol. 34, pp. 1674–1684 (Nov. 1994).

Joziasse et al., "Supertough Poly(lactide)s", *Polymer Bull.*, v. 33, pp. 599–605 (no month available on document, 1994).

*Primary Examiner*—Duc Truong
*Attorney, Agent, or Firm*—Merchant, Gould, Smith, Edell, Welter & Schmidt, P.A.

[57] ABSTRACT

The invention is directed toward melt-processable lactide polymer compositions, processes for manufacturing these compositions, and articles made from these compositions. The compositions include a first phase, which contains a polylactide-based polymer, and a second phase which includes elastomer. The elastomer is present in an amount sufficient to provide a polymer composition having an impact resistance of at least about 0.7 ft-lb/in. after the melt-processable polymer composition has been injection molded into bars and tested according to ASTM D256 (1993) method C. Preferably, the compositions also include a reactive compatibilizing agent. Methods of making these compositions and articles made from these compositions are also disclosed.

25 Claims, No Drawings

5,922,832

IMPACT MODIFIED MELT-STABLE LACTIDE POLYMER COMPOSITIONS AND PROCESSES FOR MANUFACTURE THEREOF

This is a continuation application of U.S. application Ser. No. 08/374,893, which was filed on Jan. 19, 1995 now U.S. Pat. No. 5,714,573. The entire disclosure of U.S. application Ser. No. 08/374,893 is incorporated herein by reference.

FIELD OF THE INVENTION

The present invention relates to melt-processable lactide polymer compositions and processes for manufacturing such compositions from lactide.

BACKGROUND OF THE INVENTION

The present disclosure concerns ongoing efforts in developing lactide polymers useable in preferred manners. U.S. Pat. No. 5,142,023 issued to Gruber et al. on Aug. 25, 1992, discloses, generally, a continuous process for the manufacture of lactide polymers with controlled optical purity from lactic acid having certain desired physical properties. A related process for generating purified lactide and creating polymers therefrom is disclosed in U.S. Pat. No. 5,338,822 issued to Gruber et al. on Aug. 16, 1994.

Generally, manufacturers of polymers utilizing processes such as those disclosed by Gruber et al. in the '023 and '822 patents will convert raw material monomers into polymer beads, resins or other pelletized or powdered products. The polymer in this form is typically sold to end users who extrude, blow-mold, cast films, blow films, foam, thermoform, injection-mold or fiber-spin the polymer at elevated temperatures to form useful articles. The above processes are collectively referred to herein as melt-processing. Polymers produced by processes such as those disclosed by Gruber et al. in the '023 and '822 patents, which are to be sold commercially as beads, resins, powders or other non-finished solid forms, are herein generally referred to collectively as polymer resins.

It is generally known that lactide polymers or poly (lactide)s are unstable. The concept of instability has both negative and positive aspects. A positive aspect is the biodegradation or other forms of degradation that occur when lactide polymers or articles manufactured from lactide polymers are discarded or composted after completing their useful life. A negative aspect of such instability is the degradation of lactide polymers during processing at elevated temperatures as, for example, during melt-processing by end-user purchasers of polymer resins. Thus, the same properties that make lactide polymers desirable as replacements for non-degradable petrochemical polymers also create undesirable effects during production of lactide polymer resins and processing of these resins.

There are a number of technical problems which have heretofore inhibited development of commercially viable lactide polymer-based replacement resins for existing conventional resins. Lactide polymers are subject to unwanted degradation during melt processing via a number of pathways. These pathways include hydrolysis and other side reactions, which, for example, result in molecular weight decline and/or lactide formation. Furthermore, at high processing temperatures (especially to above about 230° C.), lactide polymer degradation is accelerated.

Some of polylactide's physical properties make it difficult to use for particular types of applications. In general, polylactide is a relatively brittle polymer with a low impact resistance. Because polylactide is a relatively brittle polymer, articles made of polylactide may be brittle and prone to shatter under use conditions. For example, if polylactide is used to make articles such as razor holders, shampoo bottles and plastic caps, these articles may be prone to undesirable shatter in use.

There exists a need for polylactide polymers with modified physical properties, such as impact resistance, and methods for making these types of polylactide polymers preferably without unduly compromising other physical properties, such as tensile modulus, yield strength, and blocking resistance (i.e. tendency to stick).

SUMMARY OF THE INVENTION

The invention is directed toward melt-processable polymer compositions having at least two phases. These two phases include: (a) a first phase having polylactide-based polymer; and (b) a second phase having elastomer. Each phase may be a mixture of materials. As used herein, the term "melt-processable" refers to a polymer composition capable of withstanding melt-processing techniques, such as extruding, blow molding, injection molding, film casting, film blowing, foam making, thermal forming, fiber spinning, or other means used to convert the polymer at elevated temperatures to form useful articles. Preferably, the elastomer, if it is a polylactide-based polymer, is a non-thermoplastic elastomer. Herein, the term "non-thermoplastic-polylactide-based polymer" is sometimes used to refer to this characteristic. If a thermoplastic elastomer is used, it can be either a polylactide-based or non-polylactide-based polymer. In many preferred applications, the elastomer is a nonpolylactide-copolymerized elastomer. As used herein, the term "nonpolylactide-copolymerized elastomer" refers to an elastomer that does not comprise the product of a copolymerization with lactide or lactide oligomer.

The elastomer forming the second phase is preferably present in an amount effective to provide the melt-processable polymer composition with an impact resistance of at least about 0.7 ft-lb/in., when the melt-processable polymer composition has been injection molded into bars and tested according to ASTM D256 (1993) method C. Preferably, the compositions of the invention are provided with sufficient elastomer to provide an impact resistance of at least about 1 ft-lb/in. and more preferably of at least about 2 ft-lb/in., when the melt-processable polymer composition has been injection molded into bars and tested according to ASTM D256 (1993) method C. Most preferably, the elastomer is present in an amount effective to provide the melt-processable polymer composition with an impact resistance of at least about 6 ft-lb/in, when the polymer composition is tested pursuant to the Izod impact test. It is noted that, typically, most preferred compositions of the invention have an impact resistance of at least about 10 ft-lb/in when the polymer composition is tested pursuant to the notched Izod impact test.

Selected polymer compositions according to the present invention can be provided with an elongation at break of at least about 10%, a tensile modulus of at least about 200,000 psi, and a yield strength of at least about 3,000 psi, when the polymer composition has been injection molded into bars and tested according to ASTM D638-91, as described below. As discussed more fully below, in many applications, the second phase will comprise discrete domains within the first continuous phase. In others, especially those including relatively high elastomer content (i.e. about 20 wt %), the second phase may be co-continuous instead of comprising discrete domains within a continuous phase. In a composition with co-continuous phases, the first and second phases are each continuous in space and each is distributed relatively uniformly throughout the composition. Co-continuous phases are more fully discussed in *Encyclopedia of Polymer Science and Engineering,* 2nd Edition, Vol.9 at pp. 776–778 (Wiley-Intersciences, 1987). In the compositions, preferably, the first phase is the continuous phase and the second phase comprises a phase distinct from the first phase.

In a most preferred embodiment, the melt-processable composition includes a polylactide-based polymer in the first phase, an epoxidized rubber in the second phase, and a reactive compatibilizing agent. Preferably, the epoxidized rubber is present in an amount of about 10% by weight of the composition to about 40% by weight. As used herein, the weight percentages stated are the percent of the melt-processable polymer composition without regard to fillers, unless otherwise stated. More preferably, the epoxidized rubber is present in an amount of about 5% by weight of the composition to about 30% by weight. Most preferably, the epoxidized rubber is epoxidized natural rubber, present in an amount of at least about 10% by weight of the composition. Most preferably, the reactive compatibilizing agent is present in an amount of about 0.3% by weight to about 3% by weight of the composition. In another most preferred embodiment, natural rubber is combined with epoxidized rubber to form the elastomer phase. The provision of some natural rubber along with epoxidized rubbers can increase the biodegradability of the composition without substantially decreasing the resulting composition's relatively high impact resistance.

A wide variety of molded or blown articles, for example, dining utensils, plates, trays, disposable razor handles, and shotgun shell shot cups, can be made from the compositions of the invention. Methods of making the claimed compositions are also disclosed.

DETAILED DESCRIPTION OF THE INVENTION

The present invention relates to polylactide-containing compositions with modified physical properties and methods for manufacturing thereof. The methods and compositions disclosed herein focus on meeting certain preferred requirements of the melt-processor and end user of the polymer resin. The improved physical properties achievable with the present invention include higher impact resistance.

Applicants have found that modifying the physical properties of polylactide polymers, such as those disclosed in U.S. Pat. Nos. 5,142,023, 5,247,058, 5,247,059, and 5,274,073, 5,258,488, 5,357,035, 5,338,822, and 5,359,026, to Gruber et al., the disclosures of which are hereby incorporated by reference, using means in accord with the invention, results in lactide polymers that can be used more effectively in a wider variety of applications and processes. The polymers of the present invention may, for example, be melt-processed into films, sheets, coatings for paper, blow molded articles, fibers, foam, foamed articles, thermoformed articles, injection molded articles (such as disposable utensils) and non-woven fabrics.

Typically, polylactide polymers, such as those disclosed in U.S. Pat. Nos. 5,142,023, 5,247,058, 5,247,059, and 5,274,073 to Gruber et al. have a relatively low impact resistance. In general, these polylactide polymers have an impact resistance of about 0.1 ft-lb/in. to about 0.4 ft-lb/in. However, for many applications, preferably polymers with an impact resistance of greater than about 0.7 ft-lbs/in., as measured by the notched Izod impact test described below, are used. Such polymers, which include polylactide-based polymers and which possess many advantages concomitant therewith, are achievable with principles according to the present invention.

The notched Izod impact test is performed according to method C of ASTM method D256 (1993). A Tinius Olsen impact pendulum with either a 25 in-lb or 50 in-lb pendulum is used with standard ASTM injection molded test bars.

In general, the invention is directed toward a melt-processable polymer composition having at least two phases. The first phase contains a polylactide-based polymer. Preferably, the first phase contains a polylactide-based polymer in an amount of at least about 51% by weight of the polymer composition. A second phase of the polymer composition includes an elastomer in a sufficient amount to provide a melt-processable polymer composition having an impact resistance of at least about 0.7 ft-lb/in., when the melt-processable polymer composition has been injection molded into bars and tested according to method C of ASTM D256 (1993). Preferably, the polymer composition also contains a compatibilizing agent, such as a reactive compatibilizing agent.

The component containing a polylactide-based polymer is combined with the elastomer containing component to form a polymer composition having at least two phases. If a compatibilizing agent is used, then it can first be combined with either the component containing the polylactide-based polymer or the component containing the elastomer. Alternatively, the compatibilizing agent can be combined simultaneously with both of these components. Applicants have found that selection of an appropriate compatibilizing agent, in particular an appropriate reactive compatibilizing agent, for use in conjunction with an appropriate elastomer component is important with respect to achieving desired levels of enhancement to the polymer's physical properties, especially impact resistance, by the presence of the elastomer.

Improving Physical Properties of Polylactide

The present invention relates to improvements in the physical properties of polymers, especially those that contain polylactide or polylactide-based polymers. These improvements in physical properties, especially impact resistance, can be achieved, in accord with the invention, by addition of at least one phase containing elastomer. In general, Applicants have found that combining an elastomer-containing component with a component containing polylactide or containing a polylactide-based polymer, provides a melt-processable composition with desirable physical properties, such as impact resistance.

Generally, there are at least two well-known means of improving properties, such as impact resistance, of polymer compositions containing polylactide-based polymers. A first is to lower the glass transition temperature (i.e., $T_g$) of the polymer composition. A second involves incorporating a compound into a polylactide-based polymer in such a manner that at least one additional phase is created.

There are generally at least two well-known means for lowering the $T_g$ of a polymer, such as a polylactide-based polymer. These means include: adding a plasticizer to the polylactide-containing resin and/or adding one or more types of copolymerizing agents to a polymerizing mixture to form a polylactide copolymer. Neither the addition of either a plasticizer or providing a copolymerizing agent (to be copolymerized with lactide) typically introduces an additional phase into the resulting polymer. Indeed, generally, the presence of a separate, elastomeric phase, would be evidenced by a second $T_g$ at or below room temperature. Although lowering $T_g$ is a method whereby impact strength and elongation at break can be increased, said techniques often result in a polymer having unacceptably low tensile modulus and yield strength.

In general, the present invention concerns incorporating an elastomer as an additional phase into a polylactide-containing polymer in order to improve its physical properties, especially impact resistance (or to provide a melt-processable polymer with desirable physical properties). Instead of adding a plasticizer or copolymerizing agent to the lactide polymer or prepolymer mixture, the present invention concerns mixing an elastomer with a polylactide-containing polymer to form a polymer composition having at least two phases.

Providing a Polylactide-based Polymer

In general, any polylactide-based polymer that can be combined with an elastomer to form a melt-processable polymer composition having at least two phases is useable in accord with the invention and can be improved by the processes disclosed herein. There are at least two mechanisms according to which a polylactide-based polymer can be combined with an elastomer. The first mechanism is to provide an elastomer-containing component in a prepolymer mixture containing a lactide monomer and to polymerize the lactide monomer in the presence of the elastomer to create either, a graft copolymer, or a block copolymer. To create a graft copolymer or block copolymer would typically require the elastomer-containing component to contain some functional group to facilitate reaction of the lactide monomer or polymer.

Another mechanism involves combining an already-polymerized polylactide-based polymer component with an elastomer-containing component to form a two-phase melt-processable polymer composition. In preferred applications, the claimed invention is directed toward this second mechanism of forming a two-phase polymer composition.

In accord with certain preferred applications, the first phase includes polylactide-based polymer. As used herein, the term "polylactide-based polymer" can include mixtures, and refers to a polymeric component containing at least about 51% by weight polylactide or of which at least about 51% by weight is derived from lactide, lactic acid or combinations thereof, exclusive of any fillers which may be present. This polylactide-based polymer can include polylactide, poly(lactic acid), a copolymer of lactide or lactic acid, a blend of polylactide or poly(lactic acid) with other polymers, and mixtures thereof, provided that at least about 51% by weight of the copolymer and/or blend is derived from lactide or lactic acid. The first phase can include up to 100% by weight polylactide-based polymer.

Preferably, the polylactide-based polymer has a number average molecular weight of at least about 10,000. More preferably, it has a number average molecular weight of at least about 50,000 and, most preferably at least about 80,000. Although polylactide-based polymers with a lower number average molecular weight may be used, a number average molecular weight of at least about 10,000 is preferred for obtaining a melt-processable polymer composition with desired physical properties. In addition, preferably the polylactide used is melt-stable. A melt-stable polylactide composition includes: a plurality of polylactide polymer chains preferably having a number average molecular weight of from about 10,000 to about 300,000; lactide, if present at all, present in a concentration of less than about 2% by weight; and water, if present at all, present in a concentration of less than about 1,000 parts-per-million. In a preferred polylactide composition, the concentration of lactide is less than about 0.5% by weight, and water, if present, is present in a concentration of less than about 200 parts-per-million. These weight percentages represent the percent by weight of the polylactide polymer without regard to fillers. Applicants have found that the presence of water in greater concentration can cause excessive loss of molecular weight (which affects the physical properties of the melt-processed polymer). Catalysts, water scavengers, and stabilizing agents may also be included in the polylactide composition, as disclosed in the U.S. patents to Gruber et al. referenced above.

Processability in existing melt-process equipment generally requires that the molecular weight of the polylactide-based polymer be low enough so that the viscosity is sufficiently low for processing at melt-processing temperatures which do not cause substantial degradation. The lower viscosity allows for processing using existing conventional equipment. Reduced degradation prevents fouling while maintaining physical properties. This includes maintaining the initial molecular weight and viscosity through melt-processing to avoid changes in physical properties. Thus, the requirement of processability is that the polylactide-based polymer is sufficiently stable that decomposition or degradation by-products do not cause substantial fouling or plating out on existing equipment. As to physical properties of the polymer composition subsequent to melt-processing, preferably they are such that the end user or melt-processor can rely on the consistency of the polymer composition to give relatively constant tensile strength, percent elongation at break, impact strength, modulus of elasticity, flexural modulus, yield and flexural strength.

The polylactide-based polymer can be a copolymer resulting from polymerization of lactide with one or more additional monomers or polymers. Examples of such other monomers include glycolide, ε-caprolactone, any of the morpholine diones, delta-valerolactone, trimethylene carbonate, p-dioxanone, 1,5 dioxepan 2-one, 1,4 dioxepan-2-one, and/or salicylate lactones, epoxy, functional monomers, various aliphatic polyesters, and/or aliphatic polyethers.

Further, the polylactide-based polymer included in the invention can also be a copolymer resulting from polymerization of lactide with a comonomer which introduces side chains or branching or a polylactide composition which has been reacted to create branching or bridging, as disclosed in U.S. Pat. No. 5,359,026 or co-pending U.S. application Ser. No. 08/279,732, the specifications of which are hereby incorporated by reference.

The compositions of the invention are well adapted to include polylactide-based components in the first phase that have branched and/or bridged polylactide-based compositions therein. For example, as is disclosed in the '026 patent, a polylactide-based polymer can be formed by copolymerizing lactide, optionally other cyclic ester monomers, and a copolymerizing agent, such as an epoxidized fat or oil. These copolymerized polylactide-based polymers can be included in the first phase of the claimed invention. For example, polylactides can be copolymerized with epoxidized linseed oil and/or epoxidized soybean oil to form a polylactide-based component usable in the first phase of the invention.

In addition, polylactide molecules, which have been modified relative to linear non-substituted polylactide, to provide increased molecular interaction among polylactide backbone chains are usable in the polylactide-based component of the invention. Co-pending U.S. application Ser. No. 08/279,732 discloses polylactide compositions having improved rheology and melt-strength due to increased branching and bridging in the polymer. The polylactide-based component of the compositions of the present invention can include these rheologically improved polylactide compositions.

The polylactide-based component of the invention can also include a blend of polylactide or a polylactide copolymer with one or more additional polymers, such as polyhydroxybutyrate, polyhydroxybutyrate-co-hydroxyvalerate (PHBV), polycaprolactone, polyvinylalcohol, cellulose acetate butyrate, cellulose acetate propionate, polyesters, polycarbonates, polyamides, polydepsipeptides, polyanhydrides, polyureas, polysaccharides, and/or mixtures thereof.

The polylactide-based polymer can be the only compound included in the first phase of the invention, or the polylactide-based polymer can be combined with another compound, such as a plasticizer miscible with the polylactide-based polymer in order to form a first phase. Preferably, the plasticizer does not include substantial amounts of lower molecular weight polylactide (i.e. less than about 10,000 number average molecular weight), substantial amounts of lactide monomer, or substantial amounts of lactide oligomer. Including these types of plasticizers in substantial amounts typically decreases the melt-processability and melt-strength of the first phase component; and therefore, the final composition of the invention. Lactide monomers or oligomers are sometimes inherently present in small amounts from the polylactide processing or from depolymerization of lactide polymers. In order to facilitate the polymer composition's melt stability, the concentrations of the lactide monomer and lactide oligomer are preferably minimized during polylactide polymer formation, as is more fully discussed in the Gruber et al. patents.

Any compounds combined with the polylactide-based polymer preferably should be ones which do not substantially inhibit or interfere with the desired physical properties to be obtained with the invention, such as a relatively high impact resistance. Further, any compounds combined with the polylactide-based polymer preferably are such as will not substantially negate the melt-processability of the composition, and should be capable of forming a relatively uniform and continuous phase with a polylactide-based polymer. Most preferably, compounds combined with the polylactide-based polymer are somewhat biodegradable. As used herein, the term biodegradable refers to chemical or biological breakdown with an ultimate mineralization by microorganism.

In a preferred embodiment, the polylactide-based polymer included in the first phase of the invention is crystallizable or is derived from a crystallizable polylactide. A reason for this preference is improved impact strength can be obtained when compared with the same polylactide-based polymer that is not crystallizable or derived from a crystallizable polylactide.

As discussed in co-pending U.S. patent application Ser. No. 08/110,394 filed Aug. 23, 1993, crystallizable polylactide, generally, is formed from a mixture containing less than about 15% by weight of meso-lactide. If the polylactide is a random polymer, then less than about 15% by weight meso-lactide is preferred, but if a block polymer is formed, the polylactide can be crystallizable even if the overall monomer composition contains more than about 15% by weight meso-lactide. In order to be crystallizable within the scope of the invention, the polylactide-based polymer or the crystallizable polylactide from which the polylactide-based polymer is derived should have the ability to crystallize when held at a particular temperature between 70° C. and 140° C. for a period of about one hour. After annealing at these conditions, a crystallizable polylactide-based polymer or a crystallizable polylactide from which the polylactide-based polymer is derived should have a crystallinity of at least about 10 J/g as determined by Differential Scanning Calorimetry (DSC). A temperature of about 110° C. is often used as the temperature for crystallizing polylactide and/or polylactide-based polymers.

Preferably, the phase containing a polylactide-based polymer is at least about 51% of the polymer composition of the invention. Preferably, polylactide and/or polylactide residues make up at least about 25% by weight of the polymer composition. More preferably, at least about 50% by weight of the composition is polylactide and/or residues thereof and, most preferably, at least about 60% by weight of the composition is polylactide and/or residues thereof. The amount of polylactide and/or polylactide residues can be included in more than one phase in accord with the invention. For example, one phase of the composition may be a partially crystallized polylactide-based polymer and another phase may be a crystalline polylactide-based polymer. Preferably, the phase containing a polylactide-based polymer is a continuous phase in the composition.

Providing Elastomer

In general, the macromolecular materials of interest with respect to this component can be divided into three groups, as described by W. Hofmann in section 1.3 of the *Rubber Technology Handbook* published by Hanser Publishers, New York (1989) and distributed by Oxford University Press. These three groups are referred to herein as plastomers, elastomers, and duromers. Plastomers, which include raw rubbers, contain no crosslinks, exhibit thermoplastic flow above the melting point, and above the melting point the elastic modulus approaches zero. Duromers are a hard rubber with a tightly crosslinked structure and a very high modulus. Elastomers have a loosely crosslinked network structure and a rubbery region above the softening point. Elastomers have a more open network structure and occupy an intermediate position between the non-crosslinked plastomer and the tightly crosslinked duromer.

An elastomer is preferably included in the invention in order to achieve improved impact resistance. Duromers are believed to have a modulus which is too high to be useful. Plastomers are believed by applicants to form compositions subject to blocking (undesirable sticking together of films or objects). While not being bound by theory, it is believed that the lack of crosslinks allows the plastomer phase to migrate and fuse. If antiblock agents or other measures were found to reduce blocking, then plastomers might prove acceptable. Applicants also believe that plastomers are more likely to result in a composition with undesirable anisotropic character, as a result of the plastomer flow during final processing to form an article.

In general, elastomers can be subdivided into two groups: non-thermoplastic elastomers and thermoplastic elastomers. Non-thermoplastic elastomers maintain a useful elastic modulus up to a point of degradation. Thermoplastic elastomers maintain a useful elastic modulus up to the point at which the crosslinks melt or dissolve. Thermoplastic elastomers are elastomers which typically have crosslinks that melt or dissolve at some temperature above room temperature, but which reform upon cooling. These crosslinks are frequently crystalline segments or segments with a relatively high glass transition temperature (i.e., at last about 40° C.). There are some thermoplastic plastomers that are capable of being converted to non-thermoplastic elastomers through crosslinks formed during processing that is required to provide the claimed compositions. This process is sometimes referred to as dynamic vulcanization. These types of thermoplastic elastomers and plastomers are also useable to provide an elastomer in the invention.

A variety of elastomers can be included in a second phase in accord with the invention to achieve improved properties, such as impact resistance, when compared to polylactide-based compositions not having an elastomeric phase. Any elastomer that is at least partially immiscible (i.e. forms a separate phase) with polylactide and/or a polylactide-based polymer is useable. It is noted that more than one type of elastomer can be included in a second phase. For example, the elastomer can be epoxidized rubber mixed with natural rubber.

The elastomer may be a thermoplastic elastomer. Some examples of these types of elastomers include those with a hard (or crystalline) segment based on a polystyrene, polyurethane, polyester, polyethylene, or polypropylene and a soft segment based on polybutadiene, polyisoprene, poly(ethylene-co-butadiene), ethylene propylene diene rubber, a polyether, a polyester (especially aliphatic polyester), a poly(ester-ether),, or an aliphatic polycarbonate. The soft segment may also be a graft copolymer, block copolymer, or random copolymer, for example, of a polyester and a polyether or a polyester and a polycarbonate, or any mixture of the above.

The elastomer may be a non-thermoplastic elastomer, characterized by non-meltable crosslinking. Non-meltable crosslinks are crosslinks which degrade at elevated temperature and which do not reform upon cooling. Covalent bonding is an example of a typical non-meltable crosslink. The crosslinks may be present either prior to compounding or reaction with groups contained in the polylactide-based polymer, or they may be formed during the compounding or reaction with the polylactide-based polymer. Examples of useable non-thermoplastic elastomers include natural rubber and covalently cross-linked rubbers of flexible polymers and co-polymers made from monomers such as ε-caprolactone, p-dioxanone, lactide, glycolide, any of the morpholine diones, delta-valerolactone, 1,5 dioxepan 2-one, 1,4 dioxepan-2-one, various aliphatic polyesters, trimethylene carbonate, and mixtures thereof.

Covalently crosslinked rubbers of flexible polymers and copolymers can be made, for example, by inducing network formation during polymerization by copolymerizing monomers, such as one or more of those previously listed, with multifunctional cyclic esters or multifunctional epoxides as described in copending U.S. application Ser. No. 08/279,732, which was filed on Jul. 27, 1994 and U.S. Pat. No. 5,359,026, which issued on Oct. 25, 1994 to Gruber. The levels of addition to form a network will typically be higher than the limits set in the aforementioned application and patent, where branching without network formation was desired.

The covalently crosslinked rubbers of flexible polymers and copolymers can also be made, for example, by treatment of the corresponding plastomer with peroxides to induce a free-radical crosslinking. This can be performed during the compounding with the polylactide-based polymer.

The elastomer included in the second phase preferably has a glass transition temperature of less than about 10° C. and more preferably less than about 0° C.

The elastomer included in the second phase can be hydrolyzable, compostable, and biodegradable. Natural rubber and certain aliphatic polyester-based rubbers meet one or more of these criteria. The elastomer preferably is derived from annually renewable resources. Natural rubber is derived from annually renewable resources. Other modified rubbers, such as epoxidized natural rubber can also be derived (ultimately) from annually renewable resources (i.e. after modification).

Preferably, the elastomer and/or components of the compound making up a second phase contain(s) reactive functional groups which can be used to form some covalent bonding to the polylactide-based polymer included in the first phase, either directly or through use of a reactive compatibilizing agent.

Elastomers having functional groups that can react with the polylactide-based component in the composition (either directly or with a compatibilizing agent) are used according to certain preferred applications of the invention. For example, elastomers having carbon—carbon unsaturation, amine groups, epoxy groups, hydroxyl groups, acids, anhydrides, oxazolines, carbodiimides, isocyanates, or any other useable chain coupling agent can be used in the composition of the invention. These types of elastomers are preferred in some applications in order to facilitate bonding between the phases of the resulting composition and to provide compositions having relatively improved physical properties, such as impact resistance. Such elastomers (having functional groups) include hydroxy- or amine-containing elastomers and functionalized rubber, such as epoxidized rubbers (including, for example, epoxidized natural rubbers), maleated rubbers (including, for example, maleated natural rubbers), or acrylated rubbers (including acrylated natural rubbers).

If the elastomer is combined with another compound to form the second phase of the composition, then preferably at least one compound of the second phase has reactive functional groups to form bonds with at least one component of the first phase. When polylactide is the first phase compound, then preferably the elastomer has reactive functional groups to form bonds with polylactide. The occurrence of a reaction between any of the components in the mixture can be determined by any method known to those skilled in the art. Some test methods might include analysis for reaction products by Fourier-Transform Infrared (FTIR), $^{13}C$ nuclear magnetic resonance (NMR), or changes in solubility.

Applicants have discovered, as discussed below, that by combining a modified rubber, such as an epoxidized natural rubber, with a reactive compatibilizing agent and a polylactide-based polymer to form a multi-phase composition, the impact resistance of resulting compositions can be maximized when compared to use of natural rubber (alone or with the same compatibilizer) or the same modified rubber, alone (i.e. without the reactive compatibilizing agent), assuming analogous mixing and processing procedures.

The amount of elastomer to be included in the composition will be varied with the end use desired of the polymer composition. In general, any amount of elastomer can be included in the elastomer containing component included in the second phase and mixed with a component containing a polylactide-based polymer to form a multi-phase polymer composition, if the desired impact resistance is achieved. However, if too much elastomer is included in the composition, then the resulting composition can have poor flow characteristics, poor tensile strength, low stiffness and low surface gloss. If an insufficient amount of elastomer is included in the composition, then the resulting composition can have insufficiently improved physical properties, such as impact resistance. Therefore, enough elastomer should be included in the composition to sufficiently improve the resulting composition's physical properties and/or ductility but not so much that the resulting composition has undesirably low flow characteristics, poor strength, low stiffness, or low surface gloss. Preferably, the composition having more than one phase contains elastomer in an amount of at least about 1% by weight of the composition to not greater than about 40% by weight. More preferably, the composition contains elastomer in an amount of at least about 5% by weight, and in an amount of not greater than about 30% by weight. As stated previously, the amounts in percentage by weight indicate the percent of the polymer composition without regard to fillers.

In a most preferred embodiment, the elastomer comprises a mixture of epoxidized rubber and natural rubber. In this most preferred embodiment, the elastomer comprises at least about 50% by weight of the elastomer, epoxidized natural rubber.

The second phase of the invention can include elastomer in an amount of up to and including about 100% by weight of the second phase. It is preferable that the first phase having the polylactide-based polymer be a continuous phase in the composition and that the second phase containing the elastomer be a dispersed phase.

In order to assure that the multi-phase composition is as uniform as possible, any dispersed phase(s) should comprise discrete regions which are relatively small while maintaining effectiveness with respect to the desired physical properties, such as impact resistance. In a preferred embodiment, the elastomer contained in a second phase is in the form of elastomer domains or particles, which are dispersed throughout a continuous phase. Typically, for preferred applications the longest dimension of these elastomer particles is at least about 0.1 micron but not greater than about 20 microns. More preferably, the longest dimension of the elastomer particles is at least about 0.3 micron and not greater than about 5 microns. A random and substantially uniform spatial distribution of particles or domains is preferred. In addition to being in the form of a continuous phase and a dispersed phase, compositions of the invention can also include co-continuous phases. For example, an elastomer containing phase and a polylactide-based polymer containing phase can be co-continuous instead of dispersed and continuous.

Providing a Compatibilizing Agent

In order to improve the compatibility of the phases and components contained within the phases in the polymer composition and to substantially improve the impact resistance of compositions within the scope of the invention, means of compatibilizing the phases and/or compounds are utilized in accord with certain preferred applications of the present invention. Such means of compatibilizing the phases can be either reactive, non-reactive or mixtures thereof. Adding a compound with compatibility toward the two phases in the composition can improve the polymer's inter-phase bonding, tensile properties, impact strength resistance, and uniformity.

Selection of an appropriate compatibilizing agent is especially important to the obtaining of desired physical properties such as impact resistance. Therefore, specific preferred combinations of compatibilizing agents, elastomers and polylactide-based components to use are determined by the desired end use of the polymer compositions.

Further, a balance should be struck between the desired physical properties and the biodegradability of the resulting compositions. In many compositions of the invention, as discussed below, use of a functionalized elastomer provides a composition having a higher impact resistance than a composition in which a non-functionalized elastomer is used. However, when relatively large amounts of functionalized elastomer are included in the composition, the overall composition may not be completely biodegradable or as readily biodegradable. Further, selection of the appropriate type of compatibilizing agent is driven by the desired end use and desired end properties of the resulting composition of the invention. In addition, selection of the appropriate compatibilizing agent is driven by the particular elastomers and polylactide-based components used in the composition.

A non-reactive compatibilizing agent is one that does not provide covalent bonding with any of the components in any of the phases. A non-reactive compatibilizing agent may include a plasticizer with solubility characteristics that are between those of different phases. While not being bound by theory, it is believed that plasticizers, which can be incorporated (or partially incorporated) into the two phases, moderate the solubility characteristic, reduce the incompatibility and promote inter-phase adhesion between/among phases. Examples of plasticizers useable as non-reactive compatibilizing agents in accord with the claimed invention include plasticizers in the general classes of: alkyl esters, aliphatic esters, ethers, multi-functional esters, multifunctional ethers, and mixtures thereof. These plasticizers include alkyl phosphate esters, dialkylether diesters, dialkylether esters, tricarboxylic esters, epoxidized oils and esters, polyesters, polyglycol diesters, alkyl alkylether diesters, aliphatic diesters, alkylether monoesters, citrate ester, dicarboxylic esters, vegetable oils and their derivatives, and esters of glycerine. Most preferred plasticizers are tricarboxylic esters, citrate esters, esters of glycerine and dicarboxylic esters. These plasticizers are preferred because of their low toxicity, low volatility, compatibility with polylactide, and potential for being derived from annually renewable resources and biodegradation. Some examples of these types of plasticizers include: Citroflex® A-4, C-2, and C-4 from Morflex, Inc. of Greensboro, N.C.

A second type of non-reactive compatibilizing agent can include, for example, a block copolymer with one or more blocks which are compatible with at least one of the phases. It is believed that, for example, a di-block (A-B) copolymer, or tri-block (A-B-A) copolymer of a first segment compatible with the phase comprising elastomer and a second segment compatible with the phase comprising a polylactide-based polymer would partition itself at the interface and provide improved adhesion between the phases.

A reactive compatibilizing agent useable in accord with the claimed invention is a compatibilizing agent which forms at least some covalent bonding with at least one of the phases of the composition. For example, a compound capable of covalently bonding with the phase containing elastomer and/or the phase containing a polylactide-based polymer and which has improved compatibility with the phase with which it does not covalently bond (if any) is useable in the claimed invention. A reactive compatibilizing agent may also covalently bond with both the elastomer phase and the polylactide-based polymer phase.

Some examples of reactive compatibilizing agents useable in the claimed invention include: maleic anhydride grafted polybutadiene, epoxide functional polymers, amidated derivatives of maleic anhydride grafted polymers, hydroxy functional polymers, amine functional polymers, oxazoline functional polymers, carbiodiimine functional polymers, isocyanate functional polymers, and mixtures thereof. These polymers are preferably based on a backbone which is compatible with one of the phases in the composition, for example, on polybutadiene or polyisoprene when the elastomer phase is epoxidized natural rubber. Peroxides can also be used as reactive compatibilizing agents to promote bonding between phases. In certain preferred applications, use of a reactive compatibilizing agent provides a composition having a relatively high impact resistance.

It is believed that a catalyst can be used to facilitate reactions between any of the compatibilizing agent, polylactide-based polymer, and/or the elastomer. Suitable catalysts for reaction among particular functional groups include: phenolics, Lewis acids, and blocked Lewis acids, such as boron trifluoride monoethylamine, boron trifluoride piperidine, trimethylamine borane, and phosphorus pentafluoride complexed with amines.

Applicants have found that the selection of a reactive compatibilizing agent and a corresponding elastomer to include in a particular composition of the invention is important to obtaining a composition with most preferred characteristics. For example, Applicants have found that use of epoxidized natural rubber with a reactive compatibilizing agent provides a composition with a substantially higher impact resistance than the same composition but in which a reactive compatibilizing agent is not used. Further, use of epoxidized natural rubber (in a mixture with a polylactide-based polymer) with a reactive compatibilizing agent in accord with the invention can provide a composition with a much higher impact resistance than use of an elastomer, such as natural rubber, without a compatibilizing agent but in a mixture with the same polylactide-based polymer. In addition, because the functional groups for natural rubber are limited to C—C double bonds, many reactive compatibilizing agents for use with materials containing epoxy, amine, anhydride, carbonyl, or hydroxy moieties would not be expected to be effective with it.

Use of high amounts of epoxidized natural rubber can reduce the resulting composition's biodegradability. Polylactide-based polymers are generally biodegradable, and thus, are preferred in order to protect the environment. Therefore, in order to maintain biodegradability in a composition of the invention, the elastomer and any compatibilizing agents should also be biodegradable. In applications in which a relatively high impact resistance is not required, a biodegradable elastomer, such as natural rubber may be preferred over a less biodegradable elastomer. However, in situations where the relatively high impact resistance is desired, some reduction in biodegradability may have to be accepted for improved properties, such as increased impact resistance. In particular, epoxidized rubbers, which are less biodegradable than natural rubbers but which show much more interaction with reactive compatibilizers, may be preferred. In some instances beneficial effects can be achieved by mixing elastomers, for example, epoxidized natural rubber and natural rubber.

In accord with the invention, the reactive compatibilizing agent may be reacted during blending of the phases, or it can be reacted with one of the components prior to combining it with other components to form the composition. For example, the compatibilizing agent can be combined with the polylactide-based polymer to create a functionalized polylactide-based polymer. A functionalized polylactide-based polymer is a polylactide-based polymer which has been modified to contain groups capable of bonding to an elastomer and/or which have preferential solubility in the elastomer. Only a portion of the polylactide-based polymer may need to be functionalized in order to gain the benefit of improved impact strength, although applicants believe that a uniform distribution of functionalization throughout the polylactide based polymer would be preferred.

The functionalized polylactide-based polymer can be created during the lactide polymerization process, for example, by copolymerizing a compound containing both an epoxide rinq and an unsaturated bond with lactide as is discussed in co-pending patent application Ser. No. 08/279,732. The functionalized polylactide-based polymer, containing unsaturated bonds, could then be blended and linked via free radical reactions to an elastomer which contains unsaturated bonds. A preferred embodiment of this process is more fully explained in co-pending U.S. application Ser. No. 08/279, 732.

The functionalized polylactide-based polymer can also be prepared subsequent to polymerization, for example, by grafting a reactive group, such as maleic anhydride, to the polylactide-based polymer using peroxides.

The amount of compatibilizing agent used will vary with the particular end use of the polymer composition and the type of compatibilizing agent used. In general, if too much compatibilizing agent is added, physical properties of the polymer may be sacrificed or costs associated with production of the polymer may be excessive. Moreover, if too little compatibilizing agent is added the elastomer may have poor interfacial adhesion and poor ability to dissipate energy during crack propagation, which may result in decreased impact strength. Compositions of the invention having a reactive compatibilizing agent, preferably, include the reactive compatibilizing agent in an amount effective to interact with the polymer composition and increase impact resistance relative to the same composition having no reactive compatibilizing agent provided that the mixing procedures are uniform. Preferably, at least about 0.02% by weight of the composition is reactive compatibilizing agent and not greater than about 5% by weight is reactive compatibilizing agent. More preferably, at least about 0.3% by weight of the composition to about 3% by weight is reactive compatibilizing agent. If a non-reactive compatibilizing agent is used, then preferably at least about 1% by weight of the composition to about 30% by weight is compatibilizing agent. The weight % in this definition is based on the overall composition without regard to fillers.

Preparing the Polymer Composition

In order to combine the components to form a multi-phase polymer composition, a high shear mixing operation can be used at an operating temperature of about 140° C. to about 280° C. More preferably, mixing should be done at about 150° C. to about 200° C. Equipment useable in the high shear mixing operation includes twin screw extruders, Banbury mixers, Buss Kneader extruder, continuous mixers, and/or single screw mixers. The components are typically combined subsequent to the polymerization process of the polylactide-based polymer.

The components included in each phase, typically, are thoroughly dried prior to being compounded, in order to minimize degradation of the polylactide-based polymer. The mixing or combining step plays an important role in determining phase domain or particle size, and mixing should be sufficiently thorough for the polymer composition to be uniform. The mixing speed and time are determined by the type of mixing/blending equipment that is used, the compounds included in the composition, and the desired end product. If the components of the composition are mixed for too long, the heat build up during mixing could facilitate undesirable degradation of any polylactide-based polymers.

Further, if the components are mixed for an insufficient period of time, the resulting composition may not be uniform, the domain size may be too large, and the dispersed phase will not be evenly spatially distributed.

The size of the domains of a dispersed phase should be such that they are effective in achieving the desired physical properties. Generally, the components should be mixed until any dispersed phase(s) are in the form of domains of the desired size and are uniformly dispersed throughout the composition. As detailed in the Examples section, multiple passes of mixing on a corotating twin screw extruder have been found to be useful.

It has been found that the mixing step can be very important in determining final properties. The examples describe mixing methods which have given very positive results. While not being bound by theory, it is believed that providing a high melt viscosity throughout the mixing process is desirable. This can be achieved, to some extent, by use of high molecular weight polylactide-based polymer, temperature control of the mixing process, and staged addition of the polylactide-based polymer. It is believed that use of a semi-crystalline polylactide-based polymer feed material can also be useful and that modifying the viscosity of the polylactide based polymer, for example by use of peroxides as detailed in U.S. application Ser. No. 08/279,732, which was filed on Jul. 27, 1994, can be useful. It is also noted that the use, for example, of crosslinking agents to modify the properties of the elastomer, or to convert a plastomer to an elastomer during processing, can be of benefit.

In general, a composition of the claimed invention is made by combining the polylactide-based polymer, with the non-miscible elastomer to form the multiphase composition. Preferably, the composition includes a continuous phase comprising polylactide-based polymer. Preferably, the elastomer is in a dispersed phase or co-continuous phase in an amount which is effective to provide the melt-processable polymer composition with an impact resistance of at least about 0.7 ft-lb/in. (preferably at least about 1.0 ft-lb/in. more preferably at least about 2.0 ft-lb/in. and most preferable at least about 6 ft-lb/in., when the polymer composition has been injection molded into bars and tested according to ASTM D256 (1993) method C). This amount of elastomer can vary with the type of elastomer and with the type of reactive compatibilizing agent, if any, used in the composition of the invention.

Characteristics of the Resulting Polymer Composition

The resulting polymer composition generally has improved physical properties, such as increased ductility and impact resistance, when compared to a polylactide-based polymer composition having no elastomer-containing phase. The resulting polymer typically and preferably is one which has a number average molecular weight of at least about 50,000 and more preferably of at least about 80,000. Further, the resulting polymer composition is typically and preferably one which has a weight average molecular weight of at least about 100,000 and more preferably of at least about 160,000.

Typically and preferably, the resulting polymer compositions of the invention are ones which have an impact resistance of at least about 0.7 ft-lb/in. and preferably, an impact resistance of at least about 1 ft-lb/in., as measured using the Izod impact test previously described. More preferably, compositions of the invention are ones which have an impact resistance of at least about 2.0 ft-lb/in. and most preferably an impact resistance of at least about 6 ft-lb/in., when measured as described. It is noted that typical preferred compositions of the invention have an impact resistance of at least about 10.0 ft-lb/in when measured as described. In addition, the resulting polymer is melt-processable and can be melt-stable as described in U.S. Pat. Nos. 5,142,023, 5,247,058, 5,247,059, and 5,274,073 to Gruber et al.

The resulting polymer compositions typically have a reduced tensile modulus when compared to a polylactide polymer having no phase containing an elastomer. The tensile modulus can be measured using the test method described in ASTM D638-91 using the Type I dimensions. The crosshead speed was set at either 0.2 in/min or 2.0 in/min to obtain a break in 5 minutes or less, as described in the ASTM procedure. Typically, polylactide polymers having no phase containing an elastomer, such as those described in Gruber et al., have a tensile modulus of about 450,000 psi to about 550,000 psi. For many applications, it is desired to retain a tensile modulus of at least about 200,000 psi.

The resulting polymer compositions typically have less yield strength than comparable polylactide polymers having no elastomer-containing phase therein. The yield strength can be measured using ASTM D638-91 as discussed previously. Typically, polylactide polymers having no elastomer-containing phase therein, such as those described in the U.S. patents of Gruber et al., have a yield strength (or break strength, if they do not yield) of about 6,500 psi to about 8,500 psi. For many applications, the yield strength must be greater than some minimum value. Use of a compatibilizing agent and proper mixing can help maintain the yield strength under many circumstances. Generally, polymers in accord with the invention have a yield strength greater than about 3,000 psi.

The resulting polymer compositions, generally, have an increased percent elongation at break by comparison to the same polylactide polymer without an elastomer phase. Percent elongation at the break can be measured using the method detailed in ASTM D638-91 as discussed previously. Typically, for polylactide polymers having no elastomer-containing phase, such as those disclosed in the U.S. patents to Gruber et al., the percent elongation at break is from about 3% to about 6%. However, many applications require an improved percent elongation at break. Certain polymers of the present invention generally have a percent elongation at break greater than about 6%. Certain preferred polymers according to the present invention exhibit an elongation at break greater than at least about 10%, and in some instances, greater than about 20%. In some, the elongation at break is at least about 40%.

A melt-processable polymer composition in accord with the invention should be processable in existing melt-processing equipment by exhibiting sufficiently low viscosities at melt-processing temperatures while polymer degradation and lactide formation remain below a point of substantial degradation and do not cause excessive fouling of processing equipment. Further, the composition of the invention typically retains its molecular weight, viscosity, and other physical properties within commercially acceptable levels through the melt-processing process.

In order to further illustrate certain applications and principles of the present invention, the following examples are provided. It is noted that in these examples the notched Izod impact test results are the average of several (typically at least 5) test bars.

EXAMPLES

Example 1

Polylactide-based/Epoxidized Natural Rubber Polymer Composition with a Compatibilizing Agent ENR-50/polylactide composites were compatibilized by chemical means to give a final product with high ultimate elongation (295%) and high net Izod impact (3.8 ft-lb/in.) in injection molded test bars compared to the non-compatibilized control which had ultimate elongation 72.6% and net Izod value 2.08 ft-lb/in. ENR-50 is epoxidized natural rubber with 50% of double bonds converted to epoxide groups. Blown bottles were made, and the materials proved to have a high melt strength and easy processability.

Materials:
  Epoxyprene®-50 (ENR-50), available from Guthrie Latex, Inc., Tuscon, Ariz., cryogenically ground and talc dusted to prevent blocking
Polylactide (PLA)
  Lupersol® 101 peroxide (available from ELF Atochem North America, Inc.)
  DAI PB-178 acrylic resin (available from Dianal America, Inc.)
  A1106, Union Carbide primary amine silane
  Ruco S-101-55, low Mw polyester (available from Ruco Polymer Corp.)
  Tone® 0305, Union Carbide low Mw polycaprolactone
  Ricobond®-1731 (R-131), maleic anhydride/polybutadiene copolymer
  Ricon-1784 (R-184) Ricon Resins, Grand Junction, Colo., maleic anhydride/polybutadiene/polystyrene copolymer Polylactide was dry blended with 30 wt % ENR-50 for all runs. Compatibilizing agent was added at 1–2 wt % relative to the epoxidized rubber. The blends were fed into a Leistritz 34 mm twin screw extruder with an AccuRate feeder. These blends were mixed and pelletized. The pellets were dried and injection molded into test bars for impact resistance and tensile analysis. Some test bars were annealed in an oven at 85° C. for 15 minutes to induce crystallinity. The following extruder conditions were held constant for all runs:

| Zone 1 | 150° C. | Zone 5 | 175° C. | Zone 9 | 165° C. |
| Zone 2 | 175° C. | Zone 6 | 175° C. | Zone 10 | 150° C. |
| Zone 3 | 175° C. | Zone 7 | 175° C. | Zone 11 | 150° C. |
| Zone 4 | 175° C. | Zone 8 | 170° C. | | | screw speed = 250 rpm
pressure = 200 mm Hg
AccuRate setting = 4.0

Run Data and Results

| RUN | 72-1 | 72-2 | 72-3 | 72-4 | 72-5 | 72-6 | 72-7 | 72-8 |
|---|---|---|---|---|---|---|---|---|
| ENR-50/wt % | 30 | 30 | 30 | 30 | 30 | 30 | 30 | 30 |
| Lupersol 101 | — | 1 | — | — | — | — | — | — |
| DAI PB-178 | — | — | 2 | — | — | — | — | — |
| A1106 silane | — | — | — | 1 | — | — | — | — |
| Ruco S-101-55 | — | — | — | — | 2 | — | — | — |
| Tone 0305 | — | — | — | — | — | 2 | — | — |
| R-131 | — | — | — | — | — | — | 2 | — |
| R-184 | — | — | — | — | — | — | — | 2 |
| die T/C | 174 | 175 | 175 | 174 | 175 | 174 | 176 | 176 |
| die P/barr | 10 | 10 | 10–11 | 8–9 | 10 | 8–9 | 11 | 12 |
| Screw current/A | 11 | 13 | 12 | 10.5 | 11 | 10.5 | 11 | 11 |
| Net Izod (ft-lb/in.) | 2.08 | 1.41 | — | — | — | — | 3.78 | 3.83 |
| Annealed net Izod (ft-lb/in.) | 3.495 | 1.277 | — | — | — | — | 6.989 | — |
| Yield Strength (ksi) | 3.8 | 3.6 | 3.5 | 3.7 | 3.9 | 3.5 | 3.8 | 3.6 |
| Break strength (ksi) | 2.7 | 2.9 | 3.0 | 2.8 | 2.8 | 2.6 | 2.7 | 2.6 |
| Tens modulus | 158655 | 272317 | 253000 | 250099 | 253844 | 249567 | 230070 | 196203 |
| Yield elong. | 2.11 | 1.92 | 2.02 | 2.21 | 2.10 | 1.91 | 2.28 | 2.28 |
| Break Elong. | 72.6 | 5.86 | 10.35 | 8.18 | 14.7 | 29.34 | 295 | 294 |

Tensile properties: Testing revealed that two of the compatibilized blends (R-131 and R-184 maleic anhydride/polybutadiene copolymers) perform far superior to the control, showing very high elongation. Some of the replicates of these blends stretched the entire span of the MTS testing apparatus without breaking.

The Lupersol® peroxide sample showed unusual crazing at about a 45-degree angle down the length of the stressed region when pulled. This blend also had the highest modulus.

Since many of the other compatibilized blends tensile tested poorly, it was decided to Izod test only the most promising blends.

Impact properties: Both the R-131 and R-184 were Izod tested and had net Izod values of about 3.8 ft-lb/in. The 30 wt % ENR-50 control had a net Izod value of about 2 ft-lb/in. After crystallizing the bars, impact increased significantly for both the control and the R-131 composite.

Processing: Using cryogenically ground rubber, rather than blends made in a Ross kneader-extruder provided better properties in both elongation and impact.

Example 2

Use of Natural Rubber With/Without Compatibilizing Agent

Natural rubber, SIR 3CV-60 from Cargill Rubber Division, was compounded with poly(lactide) at 4, 8, 20, and 30 wt % rubber. A second set of samples, with a compatibilizing agent, Ricon 1731 HS, added at 5 wt % active ingredient to rubber was also prepared. Ricon 1731 HS is 69% active (1,2 polybutadiene adducted with 17 wt % maleic anhydride) coated on silica. The rubber and polylactide were dry blended and compounded in a twin screw extruder at 30 wt % rubber as a masterbatch. A second pass blended this material with polylactide to achieve the desired rubber levels.

The polylactide had a number average molecular weight of 89,000, a weight average molecular weight of 187,000, and was made from a lactide mixture of 8% meso-lactide with the remainder primarily being L-lactide.

The extruded pellets were injection molded to produce specimens for tensile and impact testing. Results are presented in the table below.

| Sample | % Elongation at Break | Tensile Modulus (psi) | Yield Strength (psi) | Net Izod Impact (ft-lb/in.) |
|---|---|---|---|---|
| PLA | 4.1 | 395,000 | 8,900 | 0.2 |
| PLA + 4% Rubber + Ricon | 16 | 393,000 | 8,100 | 0.5 |
| PLA + 4% Rubber | 23 | 376,000 | 8,100 | 0.4 |
| PLA + 8% Rubber + Ricon | 5.9 | 371,000 | 6,700 | 0.6 |
| PLA + 8% Rubber | 4.9 | 369,000 | 7,200 | 0.7 |
| PLA + 20% Rubber + Ricon | 5.1 | 282,000 | 4,600 | 1.5 |
| PLA + 20% Rubber | 6.0 | 274,000 | 4,700 | 1.5 |
| PLA + 30% Rubber + Ricon | 7.3 | 214,000 | 3,200 | 1.5 |
| PLA + 30% Rubber | 11.2 | 223,000 | 3,500 | 1.5 |

Incorporation of natural rubber resulted in some increase in net Izod impact strength and reduced tensile modulus and yield strength. The Ricon 1731 HS compatibilizing agent does not appear to be beneficial with natural rubber.

Example 3

Effect of Rubber Content, Fraction Derivatized, and Compatibilizing Agent on Blend Properties Poly(lactide) with number average molecular weight of 69,000 and weight average molecular weight of 152,000 was produced from a lactide mixture containing about 7% meso-lactide with the bulk being primarily L-lactide. The poly (lactide) was dried, devolatilized under vacuum with a nitrogen purge in a 34 mm twin screw extruder to a lactide content of less than 1 wt %, and redried. It was then dry mixed with combinations of natural rubber (NR) and epoxidized natural rubber with 50% of double bonds converted to epoxide groups (ENR-50). The ENR-50 is available from Guthrie Latex as Epoxyprene® 50. The natural rubber and the ENR-50 each were cryogenically ground and talc dusted for handling. The mixed pellets were then mixed with various amounts of a compatibilizing agent (R-131), available as Ricon 131MA-17 from Ricon Resins, Inc. The pellets were then compounded in a twin screw extruder at 150–175° C. The extrudate strand was cooled in a water trough, chopped into pellets, and redried. Test specimens were then prepared on an injection molding machine.

Compositions and results of the tests are shown in the table below. The level of compatibilizing agent is reported relative to the total amount of rubber. The fraction of natural rubber is the fraction of the total rubber which was not functionalized.

| run order | fraction natural rubber | NR + ENR wt % | R-131 wt % (relative to rubber) | net Izod ft-lb/in. | yield str. ksi | tens. modulus psi/in. | break elong. % |
|---|---|---|---|---|---|---|---|
| 10 | .25 | 8 | 1 | 0.756 | 6.5 | 391576 | 38 |
| 3 | 0 | 8 | 2.5 | 0.731 | 7.1 | 434216 | 3.4 |
| 4 | .5 | 8 | 2.5 | 0.815 | 6.7 | 391798 | 38 |
| 11 | .25 | 8 | 4 | 1.117 | 6.8 | 417738 | 15 |
| 7 | 0 | 16 | 1 | 1.109 | 5.7 | 338001 | 75 |
| 6 | .5 | 16 | 1 | 2.016 | 5.8 | 355089 | 29 |
| 15 | .25 | 16 | 2.5 | 1.89 | 5.9 | 358526 | 33 |
| 12 | .25 | 16 | 2.5 | 1.445 | 5.8 | 353749 | 57 |
| 13 | .25 | 16 | 2.5 | 1.563 | 5.7 | 327994 | 300 |
| 9 | 0 | 16 | 4 | 1.378 | 6.0 | 333912 | 165 |
| 8 | .5 | 16 | 4 | 2.335 | 5.6 | 333821 | 56 |
| 2 | .25 | 24 | 1 | 1.873 | 4.3 | 287723 | 22 |
| 14 | 0 | 24 | 2.5 | 2.806 | 4.6 | 285442 | 63 |
| 1 | .5 | 24 | 2.5 | 2.562 | 4.6 | 278051 | 85 |
| 5 | .25 | 24 | 4 | 5.435 | 4.4 | 279561 | 87 |

Analysis of the data showed that the net Izod impact strength is strongly dependent on the total amount of rubber and the amount of compatibilizing agent, the interaction term of rubber and compatibilizing agent was a particularly good correlation variable. Elongation was found to be a function primarily of the total amount of rubber and the fraction of natural rubber. Tensile modulus was found to depend primarily on the total rubber content. Yield strength was found to be dependent on all of the variables and their interactions.

Crystallization:

Bars that were annealed gave the following before and after properties:

| Run 2143-78 | X (NR) | NR + ENR | R-131 wt % | before Izod ft-lb/in. | after Izod ft-lb/in. |
|---|---|---|---|---|---|
| 5 | .25 | 24 | 4 | 5.435 | 7.208 |
| 6 | .5 | 16 | 1 | 2.016 | 1.815 |
| 8 | .5 | 16 | 4 | 2.335 | 3.730 |

In two cases crystallization yielded a definite gain in impact strength. Crystallization also proved to improve heat resistance properties in all three cases.

Morphology

A sample from Run 5 was analyzed by transmission electron microscopy. The rubber domains were found to be on the order of about 1 to about 1.5 microns in diameter. There were also many smaller, sausage shaped rubber domains that apparently have been elongated by the processing shear.

Mixing

Compositions that were re-mixed on the twin screw gave the following results:

| | RUN 2143-78 | | | | | |
|---|---|---|---|---|---|---|
| | Run 2 (1 mix) | Run 2 (2 mix) | Run 5 (1 mix) | Run 5 (2 mix) | Run 11 (1 mix) | Run 11 (2 mix) |
| X (NR) | .25 | .25 | .25 | .25 | .25 | .25 |
| NR + ENR (wt %) | 24 | 24 | 24 | 24 | 8 | 8 |
| R-131 (wt %) | 1 | 1 | 4 | 4 | 4 | 4 |
| Net Izod (ft- | 1.873 | 1.915 | 5.435 | 5.444 | 1.117 | 1.159 |

-continued

RUN 2143-78

|  | Run 2 (1 mix) | Run 2 (2 mix) | Run 5 (1 mix) | Run 5 (2 mix) | Run 11 (1 mix) | Run 11 (2 mix) |
|---|---|---|---|---|---|---|
| lb/in.) |  |  |  |  |  |  |
| Yield strength (ksi) | 4.3 | 5.0 | 4.4 | 5.1 | 6.8 | 7.2 |
| Break strength (ksi) | 1.1 | 1.3 | 1.1 | 2.4 | 1.8 | 1.9 |
| Tensile Modulus (psi) | 288 K | 309 K | 280 K | 299 K | 418 K | 425 K |
| Yield elong. (%) | 2.21 | 2.16 | 2.12 | 2.21 | 1.94 | 1.98 |
| Break elong. (%) | 22 | 37 | 87 | 211 | 15 | 20 |

A general toughening of the materials took place in all cases. There was an increase in impact strength, break strength, modulus, and elongation. This is very significant, since the extra heat history on the second series would generally have caused a decrease in mechanical properties due to degradation, if the mixing had been adequate on the first pass. Also, seeing modulus and elongation increase at the same time is a pleasant surprise. This means that the material became stiffer, while at the same time increased ductile type properties.

Example 4

Showing Effect of Fraction Modified and Extent of Modification

Samples of poly(lactide), natural rubber, epoxidized natural rubber, and compatibilizing agent were prepared by dry mixing and extruding on a twin screw extruder. The pellets were then dried, and test specimens were prepared by injection molding. All samples were prepared to a total rubber content of 30 wt % and a total compatibilizing agent content of 5 wt % active on rubber. The compatibilizing agent was Ricobond® 1731 (R-131), from Ricon Resins.

The effect of varying the fraction of modified rubber was tested by substituting natural rubber for a portion of the epoxidized rubber. The effect of varying the extent of modification was examined by using two different epoxidized rubbers, one with 25% of double bonds epoxidized (ENR-25) and the other with 50% of double bonds epoxidized (ENR-50).

The results are shown in the table below.

| Type of Epox. Rubber | Fraction of modified rubber | Net Izod Impact (ft-lb/in.) | Break Elong (%) | Yield Stress (psi) | Tensile Modulus (kpsi) |
|---|---|---|---|---|---|
| ENR-50 | 0 | 1.56 | 7.7 | 3470 | 215 |
| ENR-50 | 25 | 2.50 | 8.4 | 3470 | 208 |
| ENR-50 | 50 | 8.54 | 15.3 | 3660 | 207 |
| ENR-50 | 75 | 15.07 | 41 | 3860 | 204 |
| ENR-50 | 100 | 14.23 | 27 | 4050 | 205 |
| ENR-25 | 0 | 1.56 | 7.7 | 3470 | 215 |
| ENR-25 | 25 | 1.71 | 7.0 | 3490 | 214 |
| ENR-25 | 50 | 4.81 | 17.4 | 3290 | 202 |
| ENR-25 | 75 | 14.16 | 36 | 3430 | 193 |
| ENR-25 | 100 | 11.17 | 36 | 3420 | 195 |

The data show that for fixed levels of total rubber and compatibilizing agent the yield stress and tensile modulus are relatively constant as either the fraction of modified rubber or the extent of rubber modification are changed. Impact strength and elongation at break, however, are very strongly dependent on the fraction of modified rubber and only somewhat dependent on the extent of the modification. This indicates that it may be possible to form a high impact strength poly(lactide) using a rubber which is modified to only a slight extent, provided that a significant fraction of the total rubber molecules have been modified. For example, an epoxidized rubber with only 10% of double bonds epoxidized or perhaps only 2% of double bonds epoxidized might form a high impact strength poly(lactide) when blended in this way. With a smaller amount of epoxidation, the resulting composition will likely be more biodegradable. Therefore, a better balance between having a composition that is biodegradable and that has a relatively high impact resistance can be achieved.

Example 5

Showing Effect of Fraction Modified and Extent of Modification on Low Temperature Impact Strength Samples from the previous example were tested for impact strength at −12° C., and the results shown in the table below.

| Type of Epox. Rubber | Fraction of modified rubber | Net Izod Impact at 25° C. (ft-lb/in.) | Net Izod Impact at −12° C. (ft-lb/in.) |
|---|---|---|---|
| ENR-50 | 0 | 1.56 | 0.82 |
| ENR-50 | 25 | 2.50 | 0.94 |
| ENR-50 | 50 | 8.54 | 1.76 |
| ENR-50 | 75 | 15.07 | 1.67 |
| ENR-50 | 100 | 14.23 | 1.29 |
| ENR-25 | 0 | 1.56 | 0.82 |
| ENR-25 | 25 | 1.71 | 0.97 |
| ENR-25 | 50 | 4.81 | 1.67 |
| ENR-25 | 75 | 14.16 | 2.97 |
| ENR-25 | 100 | 11.17 | 1.90 |

In each case, higher impact strengths are achieved when a significant fraction (50% or more) of the rubber blend is from modified rubber. Also the material with the lower extent of modification (ENR-25) is seen to have a higher impact strength at low temperature. This is believed to be due to the lower Tg of the ENR-25 relative to the ENR-50 (−45° C. vs. −20° C., respectively). The applicants believe that an even lower extent of modification might be beneficial, for example, modifying 10% or perhaps as low as about 2% of double bonds in the rubber might retain the ability to form a high impact strength polylactide by blending with a reactive compatibilizing agent and may result in even better lower temperature impact strength, provided that a significant fraction of the rubber molecules have undergone at least some modification to make them more reactive. For example, higher impact strength is achieved (4.81 ft-lb/in vs. 2.50 ft-lb/in in room temperature and 1.67 ft-lb/in vs. 0.94 ft-lb/in at −12° C.) when 50% of the rubber molecules have been modified to an extent of 25% than when 25% of the rubber molecules have been modified to an extent of 50%.

Example 6

Effect of Mixing on Impact Strength

A Leistritz 34 mm twin screw extruder was used to compound a mixture of components as detailed below. The extrudate was cooled in a water bath and the strand was chopped into pellets. The pellets were then dried and injection molded into test bars for impact testing. A portion of the dried pellets were also reprocessed and tested to examine the effect of additional mixing. In general, reprocessing (i.e., providing polymer compositions that are passed through processing equipment more than once) compositions of the invention can increase the impact resistance of the compositions.

The extruder was operated with zone 1 (pellet feed zone) at 150° C., zone 2 at 160° C., zones 3–9 at 175° C., zone 10 at 160° C., and zone 11 at 150° C. The screw speed was set at 150 rpm. Pellets were fed to zone 1 at a rate of 25 lb/hr using an AccuRate feeder. A reactive compatibilizing agent, Ricobond® 1731 from Guthrie Latex, Inc., was heated to 100° C. and injected into zone 3 on the first pass, using a hot liquid injection system. The compatibilizing agent was fed at a rate of 5 wt % based on elastomer, or 1.5 wt % based upon resulting composition.

Polylactide copolymerized with 0.35 wt % epoxidized soybean oil was dried and devolatilized in a 92 mm Werner-Pfleiderer twin screw extruder and had a number average molecular weight of 76,000, weight average molecular weight of 277,000 (determined by GPC relative to polystyrene standards). The amount of residual lactide was about 0.6 wt %, of oligomers (polylactide with molecular weight below 4000) was about 5.6 wt %, and of high molecular weight polymer was about 93.8%.

Epoxidized rubber (Epoxyprene 50 from Guthrie Latex, Inc.) and natural rubber (Standard Indonesian Rubber, 60 Mooney viscosity, from Cargill Rubber Division) were cryogenically ground and dusted with talc for handling.

Seventy (70) parts by weight of the polylactide based polymer, 22.5 parts by weight of epoxidized rubber, and 7.5 parts by weight of natural rubber were dry mixed as pellets prior to feeding to the extruder.

The results of the test are shown below:

| Pass Number | Notched Izod Impact (ft-lb/in) | |
| --- | --- | --- |
| | Average | Standard Deviation |
| 1 | 2.8 | 0.3 |
| 2 | 5.6 | 0.2 |
| 3 | 7.0 | 0.1 |
| 4 | 7.4 | 0.2 |

The impact strength is increased with increased mixing.

Example 7

Effect of Rubber Modification on Biodegradability

A test was conducted to see if epoxidized natural rubber is biodegraded at the same rate as natural rubber. Samples of natural rubber, (Standard Indonesian Rubber, CV from Cargill Rubber Division), epoxidized natural rubber with 25% of double bonds epoxidized (Epoxyprene® 25 from Guthrie Latex), and epoxidized natural rubber with 50% of double bonds epoxidized (Epoxyprene® 50 from Guthrie Latex) were individually mixed with soil, saturated with water, and held at 30° C. in sealed chambers. Included in each sealed chamber there was a beaker of water to maintain 100% humidity and a beaker of sodium hydroxide solution to trap any $CO_2$ evolved as the microorganisms in the soil metabolized the sample. The sodium hydroxide solutions were titrated and replaced every 5–6 days and cumulative $CO_2$ evolution was calculated and reported as equivalent percent of carbon in the sample. After 85 days the results showed the natural rubber to be about 12% consumed, the Epoxyprene® 25 to be 5.5% consumed, and the Epoxyprene® 50 to be not measurably affected. At this point in the test the $CO_2$ evolution appears steady, with no sign of yet reaching a plateau.

Example 8

Tests Using Various Polylactide-Based Polymers

Tests were carried out using a variety of polylactide-based polymers, with properties shown in the table below. The polylactide-based polymers were all prepared by batch polymerization at about 180° C., with monomer/catalyst mole ratios of between 10,000/1 and 40,000/1. The catalyst was tin II bis(2-ethyl hexanoate). For samples 1–6, 0.015 wt % of a process stabilizer (Weston 618 from G.E. Chemicals) and 0.35 wt % of epoxidized soybean oil (C. P. Hall) were mixed into the lactide prior to polymerization. These weight percentages are based upon the composition without regard to fillers. For sample 7, 0.15 wt % of the process stabilizer Weston TNPP (from G.E. Chemicals) was added to the lactide. Sample 4 was crystallized in pellet form prior to mixing with the other components.

Molecular weights, oligomer analysis, and residual lactide analysis were performed using gel permeation chromatography, calibrated against polystyrene standards. Oligomers include polymer having a molecular weight less than about 4,000. Analysis of the polymer (%R lactic acid residues) for optical composition was by chiral liquid chromatography, following saponification in dilute NaOH. Viscosity of the polymer was determined using a Rosand capillary viscometer, with zero and Rabinowitsch corrections applied, at a temperature of 190° C. and a shear rate of 1000 $s^{-1}$.

In each case, 70 parts by weight of polylactide-based polymer were dry blended with 22.5 parts by weight of Epoxyprene 50 (Guthrie Latex, Inc.) and 7.5 parts by weight of natural rubber (SIR CV, 60 Mooney viscosity, Cargill Rubber Division). The Epoxyprene 50 and the natural rubber had each been cryogenically ground and dusted with talc for handling.

The materials were compounded on a Leistritz 34 mm twin screw extruder, with addition of 1.5 wt % of Ricon 1731 as a hot liquid at zone 3.

| Sample | Mn × $10^{-3}$ | Mw × $10^{-3}$ | Oligomer wt % | Lactide wt % | % R | Visc. at 1000$s^{-1}$ (Pa-s) | Izod ft-lb/in |
| --- | --- | --- | --- | --- | --- | --- | --- |
| 1 | 70.2 | 178 | 2.9 | 1.1 | 4.3 | 152 | 2.0 |
| 2 | 91.6 | 246 | 3.4 | 1.4 | 7.7 | 203 | 9.1 |
| 3 | 97.4 | 246 | 2.5 | 1.5 | 3.0 | 211 | 10.0 |
| 4 | 95.3 | 227 | 2.6 | 1.1 | 2.0 | 198 | 10.5 |
| 5 | 90.7 | 274 | 2.2 | 1.4 | 27.0 | 156 | 2.2 |
| 6 | 105.0 | 252 | 2.4 | 1.3 | 1.6 | 226 | 11.4 |
| 7 | 64.0 | 131 | 3.7 | 0.6 | 26.0 | 125 | 2.1 |

Note that the highest Izod impact numbers are obtained from the polymers with the highest viscosity. This may indicate the need for carefully controlling conditions of the mixing and selection of the polylactide polymer in order to obtain the highest possible impact resistance.

Example 9

Results Using Buss Kneader Extruder

A polylactide-based polymer, with number average molecular weight of about 97,000 and weight average molecular weight of 246,000, was prepared by mixing lactide monomer (primarily L-lactide, with about 6% meso lactide) with 0.35 wt % of epoxidized soybean oil (C. P. Hall) and tin II (bis(2-ethyl hexanoate) at a molar ratio of 1 part tin per 40,000 parts lactide and polymerizing at about 180° C. The polymer was devolatilized under vacuum with nitrogen purge in a 92 mm Werner-Pfleiderer twin screw extruder and pelletized.

An epoxidized rubber, Epoxyprene 50 from Guthrie Latex, Inc. (Tucson, Ariz.), was cryogenically ground and dusted with talc for handling.

Natural rubber, SIC CV 60 Mooney from Cargill Rubber Division, was also cryogenically ground and talc dusted.

The polylactide-based polymer, the epoxidized rubber, and the natural rubber were dry blended in the ratio of 70/22.5/7.5 parts by weight. This material was then further processed in a 70 mm Buss Kneader Extruder. With no additional agents, the compounded material, when tested for notched Izod impact strength, gave a result of 3.7 ft-lb/in. When Ricobond 1731 liquid was added to the composition at about 0.75 wt % overall, the material, which was compounded in the same manner as when no compatibilizing agent (i.e., Ricobond 1731 liquid) was included, was tested for notched Izod impact strength gave a result of 18.8 ft-lb/in.

Example 10

Effect of Mixing

Materials:

Polylactide-based polymer, Mn-91000, Mw-246000, 0.35 wt % of epoxidized soybean oil copolymerized with lactide using tin II bis(2-ethyl hexanoate) catalyst Epoxyprene 50 (Guthrie Latex, Inc.)

Natural rubber (SIR CV 60 Mooney, Cargill Rubber Division)

Compatibilizing Agent (Ricobond 1731 liquid, Ricon Resins)

The materials were mixed in a ratio of 70 parts by weight polylactide-based polymer, 22.5 parts by weight Epoxyprene 50, 7.5 parts by weight natural rubber, and 1.5 parts by weight of the compatibilizing agent. Notched Izod impact tests were conducted on injection molded samples following the mixing. Mixing was performed in a Leistritz 34 mm twin screw extruder, with 9 zones plus a feed section. Liquid compatibilizing agent was added at zone 3. For experiments labelled "split feed," polylactide polymer was added at two points.

Three procedures were tested. "Standard" procedure used dry mixing of all ingredients, except the compatibilizing agent, and feeding into the extruder feed throat. Pellets were collected and subjected to a second pass. "Masterbatch" used the "standard" procedure at a total Epoxyprene/natural rubber level of 46 wt %. This level was then diluted down to 30 wt % total of Epoxyprene/natural rubber on a second pass. "Split feed" used all of the Epoxyprene and natural rubber with half of the polylactide-based polymer dry mixed and fed at the feed throat and the other half of the polylactide-based polymer added at zone 3, using a Leistritz side stuffer outfitted with a copper cooling coil. The results are shown in the table below.

The highest impact strength was obtained using the split feed technique with a high screw speed. Of special interest is that with this combination of materials and mixing technique, a relatively high impact strength was obtained (12 ft-in/lb) even without compatibilizing agent. Also note, however, that the use of the compatibilizing agent resulted in even higher impact strength. Applicants believe that viscosity control in the mixing zone is important to achieve high impact strength.

In general, processing techniques can contribute to provide a polymer composition of the invention with a relatively high impact resistance. Typically, reprocessing (i.e., passing the polymer composition through processing equipment, such as a mixer or an extruder, more than one time) and adding the polymer composition at more than one place or zone during processing can increase the resulting polymer's impact resistance.

| Sample | Material | Pass Ricon Added | Number of Passes | Screw Speed Pass 1 | Screw Speed Pass 2 | Feeding Style | Net Izod ft-lb/in |
|---|---|---|---|---|---|---|---|
| 1 | 30% elastomer | 1 | 2 | 250 | 250 | standard | 13.9 |
| 2 | 30% elastomer | 1 | 1 | 250 | • | standard | 12.5 |
| 3 | 30% elastomer | 1 | 2 | 250 | 250 | masterbatch | 14.0 |
| 4 | 30% elastomer | • | 2 | 250 | 250 | masterbatch | 12.0 |
| 5 | 30% elastomer | 1 | 2 | 250 | 100 | masterbatch | 12.6 |
| 6 | 30% elastomer | 2 | 2 | 250 | 250 | masterbatch | 12.9 |
| 7 | 30% elastomer | 1 | 1 | 350 | • | split | 16.2 |
| 8 | 30% elastomer | 1 | 1 | 250 | • | split | 14.6 |
| 9 | base PLA | • | • | • | | | 0.5 |

What is claimed is:

1. A melt-processable polymer composition comprising:
   (a) a first phase, said first phase comprising a polylactide-based polymer having a number average molecular weight of greater than about 80,000; and
   (b) a second phase, said second phase comprising elastomer;
   (i) said elastomer being present in an amount effective to provide the melt-processable polymer composition with an impact resistance of at least about 1 ft-lb/in. when the melt-processable polymer composition has been injection molded into bars and tested according to ASTM D256 (1993) Method C and an elongation of greater than about 6 percent according to ASTM D638-91; and
   (ii) if said elastomer comprises a polylactide-based polymer, said elastomer being non-thermoplastic.

2. A composition according to claim 1, wherein the elastomer is present in an amount effective to provide the melt-processable polymer composition with an impact resistance of at least about 6 ft-lb/in when the melt-processable polymer composition has been injection molded into bars and tested according to ASTM D256 (1993) Method C.

3. A composition according to claim 1, wherein the first phase is a copolymerized polymer of lactide and epoxidized soybean oil.

4. A composition according to claim 1, wherein said first phase is continuous and said second phase comprises a phase distinct from said first phase.

5. A composition according to claim 1, wherein said second phase is continuous and said first and second phases are co-continuous.

6. A composition according to claim 1, wherein said second phase comprises discrete domains within said first phase.

7. A composition according to claim 1, wherein said elastomer includes natural rubber.

8. A composition according to claim 1, wherein said elastomer includes epoxidized natural rubber.

9. A composition according to claim 1, wherein said elastomer comprises a mixture of epoxidized natural rubber and natural rubber, said elastomer comprising at least 50%, by weight, epoxidized natural rubber.

10. A composition according to claim 1, wherein said elastomer is selected from the group consisting of: synthetic rubbers, cross-linked rubbers of flexible polymers; cross-linked rubbers of flexible co-polymers, and mixtures thereof.

11. A composition according to claim 10, wherein said elastomer consists of crosslinked rubbers of flexible co-polymers and comprise a reaction product of mixtures of monomers selected from a group consisting of lactide, glycolide, any of the morpholine diones, ε-caprolactone, δ-valerolactone, p-dioxanone, tri-methylene carbonate, 1,5 dioxepan-2-one, 1,4 dioxepan-2-one, and mixtures thereof.

12. A composition according to claim 10, wherein said elastomer consists of cross-linked rubbers of flexible polymers and comprise a reaction product of monomers selected from the group consisting of ε-caprolactone, valerolactone, p-dioxanone, 1,5 dioxepan-2-one, 1,4 dioxepan-2-one, tri-methylene carbonate, and mixtures thereof.

13. A composition according to claim 1, wherein said elastomer is present in an amount of about 1% to about 40% by weight of the composition.

14. A composition according to claim 1, wherein the composition contains elastomer in an amount effective to provide the melt-processable polymer composition with an impact resistance of at least about 2 ft-lb/in. when the composition has been injection molded into bars and tested according to ASTM D256 (1993) Method C.

15. A composition according to claim 14, wherein said elastomer comprises epoxidized natural rubber and wherein said elastomer is present in an amount of at least about 10% by weight.

16. A composition according to claim 15, wherein the composition includes a reactive compatibilizing agent in an amount effective to interact with the polymer composition and increase impact resistance, relative to its absence.

17. A composition according to claim 1, wherein the first phase comprises a polylactide-based polymer covalently bound with a reactive compatibilizing agent.

18. A composition according to claim 1, wherein the polymer composition has an elongation at break of at least about 10%; wherein the polymer composition has a tensile modulus of at least about 200,000 psi; and wherein the polymer composition has a yield strength of at least about 3,000 psi, when the composition has been injection molded into test bars and tested according to ASTM D638-91 using Type I dimensions.

19. A composition according to claim 1, wherein the polylactide-based polymer is a crystallizable polylactide-based polymer.

20. A composition according to claim 1, including a reactive compatibilizing agent in an amount of at least about 0.3% by weight of the polymer composition and not greater than about 3% by weight.

21. A composition according to claim 20, wherein the reactive compatibilizing agent is maleic anhydride grafted polybutadiene.

22. A molded article comprising a melt-processable polymer composition, said polymer composition comprising:
   (a) a first phase, said first phase comprising a polylactide-based polymer having a number average molecular weight of greater than about 80,000; and
   (b) a second phase, said second phase comprising elastomer in an amount effective to provide the melt-processable polymer composition with an impact resistance of at least about 1 ft-lb/in. after the melt-processable polymer composition has been injection molded into bars and tested according to ASTM D256 (1993) and an elongation of greater than about 6 percent according to ASTM D63 8-91; wherein if said elastomer is a polylactide-based elastomer, it is a non-thermoplastic polymer.

23. A molded article of claim 22, comprising a shotgun shell shot cup.

24. A method of making a melt-processable polymer composition, said method comprising a step of:
   (a) combining a first component with a second component to form a melt-processable polymer composition having first and second discrete phases; said first component forming said first phase and comprising a polylactide-based polymer having a number average molecular weight of greater than about 80,000; and said second component forming said second phase and comprising elastomer in an amount effective to provide the melt-processable polymer composition with an impact resistance of at least about 1 ft-lb/in. when the melt-processable polymer composition has been injection molded into bars and tested according to ASTM D256 (1993) and an elongation of greater than about 6 percent according to ASTM D638-91; wherein if said elastomer is a polylactide-based elastomer, it is a non-thermoplastic polymer.

25. A method according to claim 24, wherein said step of combining includes providing an effective amount of a reactive compatibilizing agent to provide an impact resistance greater than in its absence.

* * * * *

UNITED STATES PATENT AND TRADEMARK OFFICE
CERTIFICATE OF CORRECTION

PATENT NO. : 5,922,832
DATED       : JULY 13, 1999
INVENTOR(S) : RANDALL ET AL.

It is certified that error appears in the above-identified patent and that said Letters Patent is hereby corrected as shown below:

Col. 3, line 15: "10%" should read --1%--

Col. 4, line 1: "0.7 ft-lbs/in" should read --0.7 ft-lb/in--

Col. 9, line 1: "last" should read --least--

Col. 22, line 46: "Tg" should read --$T_g$--

Col. 26, line 16: "(12 ft-in/lb)" should read --(12 ft-lb/in)--

Col. 26, in the Table, at Col. 6 entitled "Pass 2", line 12: insert --•--

Col. 26, Table: Col. 7, line 12: delete "0.5" under the word "split"

Col. 26, Table: Col. 8, line 12: insert --0.5-- under the numeral "14.6"

Col. 28, line 32: "D63 8-91" should read --D638-91--

Signed and Sealed this

Seventeenth Day of April, 2001

*Attest:*

NICHOLAS P. GODICI

*Attesting Officer*     *Acting Director of the United States Patent and Trademark Office*